United States Patent [19]

Plevy

[11] 4,080,594
[45] Mar. 21, 1978

[54] DOPPLER SHIFT ACTUATOR AND INTRUSION SYSTEMS

[76] Inventor: Arthur L. Plevy, 9 Yorktown Rd., East Brunswick, N.J. 08816

[21] Appl. No.: 705,018

[22] Filed: Jul. 14, 1976

[51] Int. Cl.² .................. G08B 13/16; H03K 23/00
[52] U.S. Cl. .............................. 340/258 A; 235/468; 340/147 MD; 340/274 C; 343/5 PD
[58] Field of Search ........... 340/258 B, 258 D, 274 C, 340/149 R, 147 MD, 258 A; 317/134; 235/61.11 E; 343/5 PD, 7 ED; 49/25, 31; 361/171, 172

[56] References Cited

U.S. PATENT DOCUMENTS

| 3,665,443 | 5/1972 | Galvin | 340/258 A |
|---|---|---|---|
| 3,680,074 | 7/1972 | Lieser | 340/258 A |
| 3,732,465 | 5/1973 | Palmer | 317/134 |
| 3,733,581 | 5/1973 | Kalmus | 340/258 A |
| 3,760,400 | 9/1973 | Galvin et al. | 340/258 A |
| 3,769,515 | 10/1973 | Clark, Jr. | 250/341 |
| 3,845,461 | 10/1974 | Foreman | 340/258 A |
| 3,891,980 | 6/1975 | Lewis et al. | 317/134 |
| 4,009,476 | 2/1977 | Lutz | 343/7 ED |

Primary Examiner—John W. Caldwell, Sr.
Assistant Examiner—Joseph E. Nowicki

[57] ABSTRACT

In a first mode, a security system uses the Doppler effect to permit the automatic activation of a bolt by the patterned movement of a reflecting card in the vicinity of a Doppler unit. In a second mode, the system behaves as a conventional intrusion detection system to activate an alarm for an unauthorized intruder present within an area to be monitored.

The first mode operates to verify a combination given a user implemented by the movement of a reflecting member towards and away from the Doppler unit based on a predetermined code. If the movement of the reflector is proper and within a predetermined time period, a valid comparison will be had to automatically cause a bolt to unlatch and open the door. The unit is placed in the second mode when all access to the door is prohibited and the system operates as a conventional intrusion detector.

11 Claims, 3 Drawing Figures

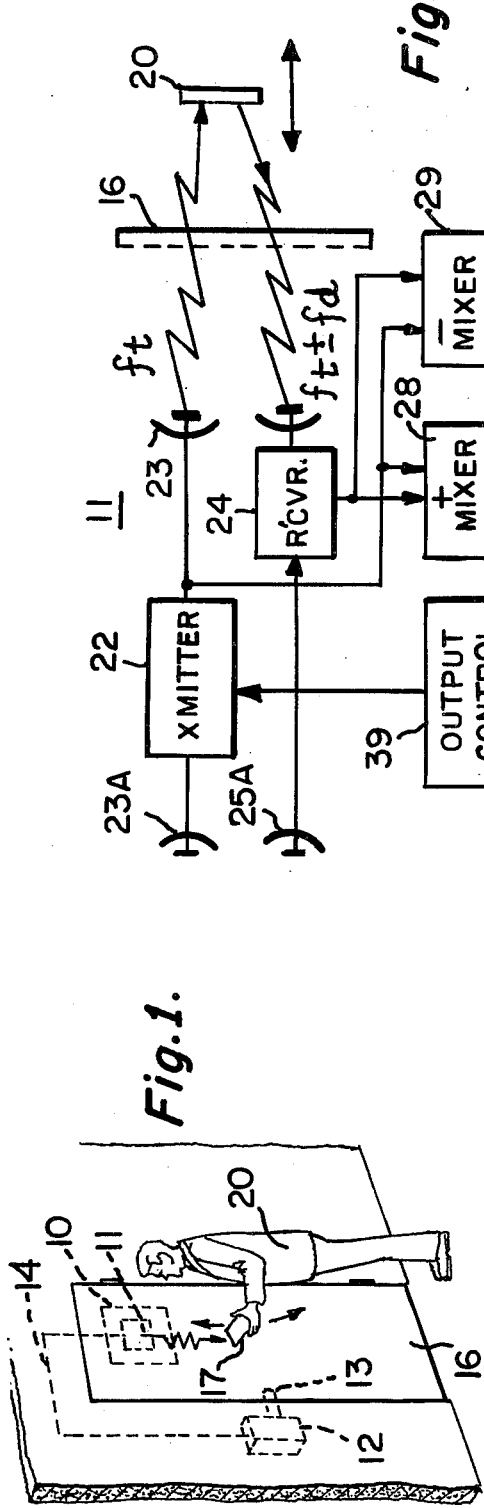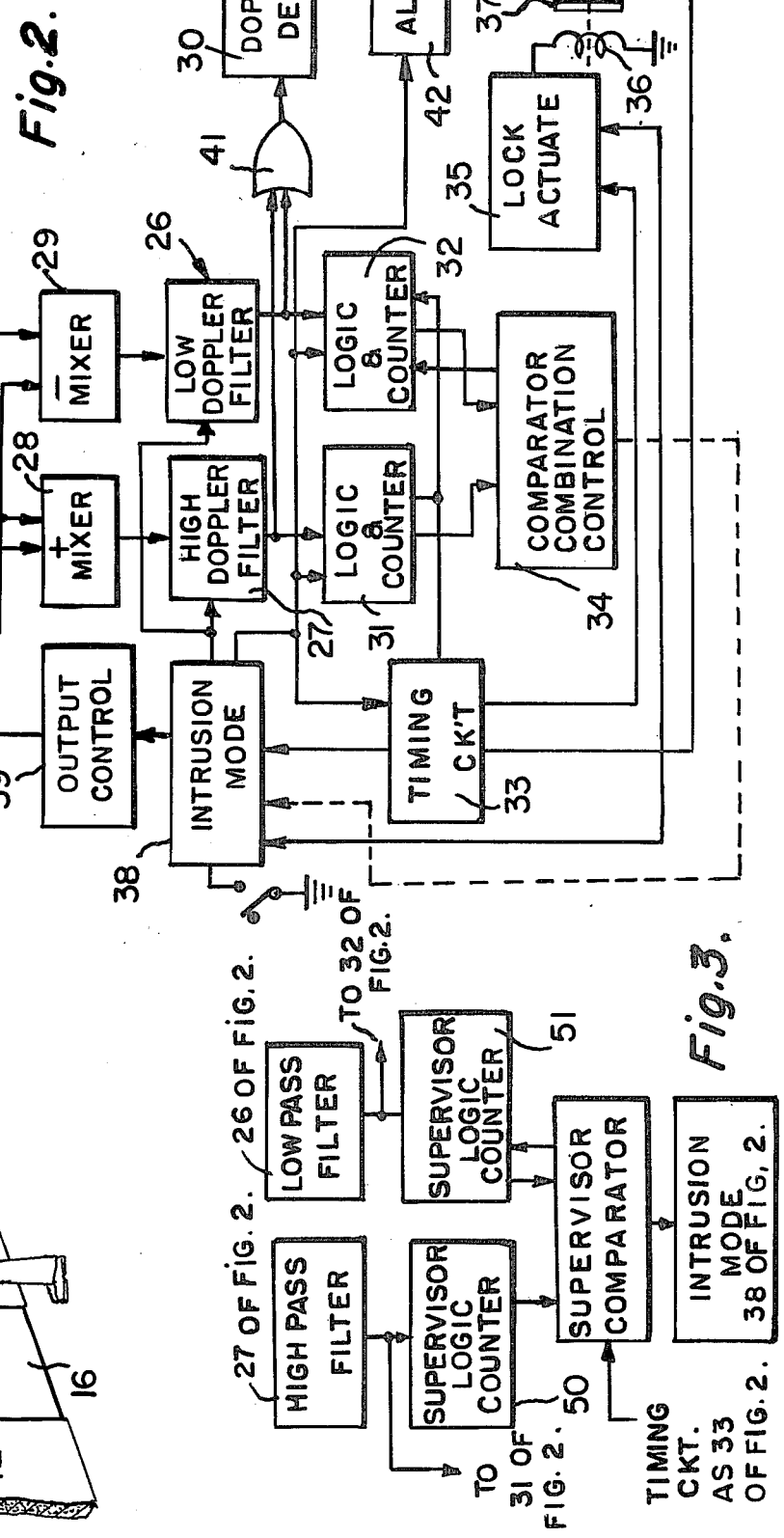

DOPPLER SHIFT ACTUATOR AND INTRUSION SYSTEMS

BACKGROUND OF INVENTION

This invention relates to electronic sensing and actuator control systems for responding to the proximity of an object in a sensing area and for remotely controlling an actuator. The apparatus can be employed as an instrusion detection system during a second mode of operation to protect a secured premise from unauthorized intrusions.

There are a plethora of patents in existence which described electronic locks and keys of all designs and configurations. Many such systems employ a credit card or similarly designed key which may include passive or active circuits for insertion of the same into a slot associated with a lock module. If the apparatus on the card interfaces accordingly with those components present in the lock module, an actuator is energized to enable one to access the area secured by the lock. Such electronic devices have utility in that the locking combinations can be easily changed for use in motel, hotel or similar types of establishments.

Another class of such devices do not require an alteration of an area to create a slot or a key receiving station and operate without such a slot.

Such a system is generally described in U.S. Pat. No. 3,732,465 entitled ELECTRONIC SENSING AND ACTUATOR SYSTEMS by R. S. Polimer and issued on May 8, 1973. Other related systems are shown in U.S. Pat. Nos. 3,752,960, 3,816,708 and 3,816,709.

These systems operate without the need of a card or key accommodating slot and therefore, do not require any modifications to be made to a door or entrance to be accessed and secured by a remote lock according to this type of apparatus.

The systems employ a module which is positioned on a door and which transmits an electrical signal. A card is held in proximity to the door and affects or loads on an oscillator associated with the transmitter. The card contains interconnected electronic components and serves to alter the transmitted signal in a predetermined manner to electrically actuate the locking mechanism.

The advantage of such systems is that one need not access a slot or fit the card or key into an aperture and one merely has to present the card within a sensing area to remotely activate the mechanism.

In any event, such systems suffer in that the cards or keys are relatively complicated and difficult to fabricate as including passive and/or active components. The concept of loading an oscillator is relatively unreliable in that many extraneous noise sources and factors will obscure and effect system operation.

It is therefore an object of the present invention to provide an improved remote actuating and sensing system in the form of an electronic lock, which system can also operate in a second mode to detect the presence of an intruder on secured premises; if desired.

BRIEF DESCRIPTION OF PREFERRED EMBODIMENT

A security system for permitting an authorized user to gain entry to a secured premises via a door which is locked by means of an electrically activated bolt, comprising of a Doppler transmitter for directing transmitted energy at a given frequency in the vicinity of said door, a Doppler receiving means responsive to a predetermined number of movements in the vicinity of said door to provide a series of output pulses according to said pattern, and means responsive to said pulses to verify that said pattern is authorized to activate said bolt to permit entry via the unlocking of said door.

BRIEF DESCRIPTION OF FIGURES

FIG. 1 is a block diagram depicting the use of an actuator control system according to this invention.

FIG. 2 is a detailed block diagram of an actuator and intrusion control system according to this invention.

FIG. 3 is a block diagram of a supervisor control circuit.

DETAILED DESCRIPTION OF FIGURES

Referring to FIG. 1, there is shown a door or entrance 16. A Doppler system 11 is mounted within an area 10 of the door and is located on the door inside the room or enclosure which the door permits access to. A cable 14 emanates from the Doppler system 11 and serves to control a solenoid or electrically activated lock mechanism as 12, associated with a bolt 13.

A user 20 wishing to gain access to the premises secured by the door has a card or key 17. The card 17 is basically a metallic or other good electrical energy reflecting material and as such, may be covered or laminated with a plastic as Hypalon or some other material which is relatively unaffected by electrical radiation.

The Doppler unit 11 which may operate in the microwave or ultrasonic region, transmits a carrier frequency over a specified area determined by the antenna pattern used in the Doppler unit 11, as will be further explained.

The Doppler effect is well known in the communication art and basically can be described as follows:

The Doppler effect is provided when a vibrating source of transmitted electrical energy impinges on a moving target. Generally, as the source approaches the target, the frequency observed at the receiver is higher than that transmitted. If the source is receding, the observed frequency is lower. The Doppler effect has been extensively used in radar systems, intrusion detection systems and in a variety of other ways for measuring the velocity of an object or detecting the presence of an object.

In the system to be described, an authorized user is given a card which essentially, is an excellent reflector of electrical energy as emitted by the Doppler unit 10. The card 17 may have a parabolic surface for concentration of the transmitted energy and subsequent reliable reflection. The metal deposited or otherwise located on the card may be dimensioned as a quarter wavelength of the transmitted frequency to function to effectively reflect the energy transmitted from the Doppler system 11 back to the area 10.

In the system to be described, the user 20 is given a predetermined code or combination necessary to operate the lock 12 and to gain access to the secured area guarded by the door.

The user 20 moves the card 17 towards the door 16 a given number of times at a relatively rapid rate. It will be shown that this rate is not critical. He then pauses and moves the card 17 in an opposite direction rather rapidly or controllably away from the door. The sequence of moving the card 17 and the number of movements necessary, as will be shown, is completely random and determined only by the programming of the Doppler module 11.

Essentially, the movement of the card 17 towards and away from the unit in a specified time and direction is determinative of a combination which is detected by the Doppler unit 11. If the proper combination and sequence is implemented by the user, the bolt 13 will unlatch and the door will open; providing access to the premises.

Referring to FIG. 2, there is shown a block diagram of an embodiment of the system.

As indicated, the Doppler system is well known and many different approaches for providing transmitted waves can be employed and are conventionally known as pulse or continuous transmission systems.

Referring to FIG. 2, the Doppler system 11 is located behind a door or wall of an area 10. It is noted at the onset, that if one desires to use microwave frequencies, that the same are impervious to typical construction materials as wood, plaster, and so on and would penetrate or be transmitted through such materials. If one desired to use ultrasonic frequencies, then the unit would be mounted as indicated, but one would have a small screen or mesh to permit the waves to be transmitted outside the enclosure. This can also be accommodated by placing the unit behind a vent and so on to permit the ultrasonic waves to be transmitted beyond the enclosure or to the area where a user will be located.

A Doppler system conventionally contains a transmitter 22 which may be an ordinary oscillator operating at a desired frequency in the microwave or other band. The transmitter is conventionally coupled to a transmitting antenna 23.

The antenna 23 can be of almost any configuration suitable for providing a radiation pattern which will spread transmitter energy over a desired area. As such, a wire loop or other simple type of antenna can be employed.

Also shown is a receiving antenna 25. The antenna 25 is responsive to the energy reflected from a target. The transmitting antenna 23 and the receiving antenna 25 can be a single unit operating in conjunction with a circulator or a transmit receiving switch.

There are many systems known in the art for multiplexing a common antenna to utilize the same for both transmitting and receiving.

The receiving antenna is coupled to the input of a receiver circuit 24 which may consist of a tuned amplifier which would be responsive to received frequencies within the operating specifications of the system. The output of the receiver is coupled to two mixer circuits 28 and 29 respectively designated as +mixer 28 and −mixer 29. These mixers function to process the received frequency in order to derive the Doppler frequency. Accordingly, another input to each mixer is derived directly from the transmitter 22 and basically is the frequency signal as transmitted.

Normally, a mixer is used in Doppler systems to derive the Doppler frequency by the subtraction or addition of the received frequency from the transmitted frequency. In this case it is important to know whether the received frequency is higher or lower than the transmitted frequency. This is important due to the fact that a user of the system possesses a combination determining how the card 17 is to be moved.

Hence, if the card is moved towards the door or as the card approaches the antenna 25, the Doppler frequency increases. Alternatively, if the card is moved back from the antenna 25, the Doppler frequency decreases.

For example, the +mixer 28 will produce a predominate side band for all frequencies above the transmitted frequency; while the −mixer will produce a predominate side band for all frequencies below the transmitted frequency. Each mixer is followed by a filter. Thus, a filter 26 is associated with mixer 29 and a filter 27 is associated with mixer 28.

The filters 26 and 27 are referenced as a low Doppler filter 26 and a high Doppler filter 27. The filter 26 responds to the low Doppler frequencies and the filter 27 responds to the high Doppler frequencies.

For example, assume that a given motion towards the door by a card as 17 causes a Doppler shift of 500Hz. The frequency received by antenna 25 would be 500Hz greater than the transmitted frequency. Hence, mixer 28 would provide a large upper side band which would be within the band pass of filter 27. In a similar manner, if the motion of the card 40 were away from the door at the same velocity, a 500Hz decrease in the transmitted frequency would be received. This lower frequency would cause the low Doppler filter 26 to provide an output.

The use of band pass filters at an output of a Doppler system is known and certain Doppler systems employ a bank or a series of overlapping narrow band filters to permit narrow band width protection and so on.

Examples of many suitable Doppler systems which can be employed with this invention, are shown in a text entitled AIRBORNE RADAR edited by Merrill and published by Boston Technical Publishers, Inc., 1965.

The high Doppler filter 27 is coupled to a logic and counter circuit module 31, while the low Doppler filter is coupled to a logic and counter module 32. A timing circuit 33 controls the operation of the logic and counter circuit modules as will be more fully described.

The output of the logic and counter circuit modules 31 and 32 are applied to the inputs of a comparator combination control circuit 34. The function of the circuit 34 is to store therein the correct combination necessary to access the lock. The stored combination is compared with the outputs of the counters 31 and 32. If the comparison is favorable, the combination control circuit 34 provides an output to a lock circuit 35.

The circuit 35 operates a solenoid as 36 to activate a bolt or latch 37 in order to operate or open a door 16 present on the secured premises.

Also shown in the FIG. is an output control circuit 39 which is coupled to the transmitter 22. An input to the output control circuit 39 is derived from an intrusion mode module 38. The intrusion mode module in conjunction with an AND circuit 41 and a Doppler detector circuit 30, can operate an alarm 42 to enable this system to also monitor the secured premises during hours where no one is permitted access to the door 16, as will be more fully described.

THEORY OF OPERATION

In general, the system depicted above operates as follows:

A user is given a key 17 which may have a general appearance of a credit card, but any other configuration will be suitable. Preferably, as indicated, the card 17 is fabricated from a good, electric reflecting material, such as a metal.

It is understood that the Doppler frequency, depending on the frequency of the transmitter, will occur for any moving object relatively independent of the composition of the object. For example, ultrasonic waves are essentially high audio frequencies and will be reflected from any moving object, such as wood, cloth or from animals or humans. This is also true of microwave frequencies.

However, a certain portion of the energy transmitted is absorbed. If one therefore provides a user with an excellent reflector as card 17, it will be assured that the return signal is relatively large compared to those signals which would be received due to spurious movements which may occur about the secured entrance based on normal everyday activities.

Hence, one can operate the transmitter 22 during the door access mode at a relatively low level and hence, the energy transmitted during this mode can be small since the card 17 will serve to reflect back a large portion of the same. The purpose of the card is to cause a user to believe that the system possesses other features evidenced by data which he will assume is present on the card.

Due to the energy levels transmitted, one would not be able to activate the system without the card 17, although other reflectors might suffice as well.

The user will approach the door 16 with his card until he enters the radiation area of the transmitter. This, of course, is not critical and one may stand anywhere between a few inches or a few feet from the door and still be able to access the system. The distance is purely a function of the amount of power transmitted by the antenna 23.

When a card 17 is issued to the user, he is given a combination which enables him to implement a series of movements of the card in a particular sequence to gain access to the premises.

For example, the user is told that the card 17 is to be moved towards the door rather rapidly three times and then held and moved back from the door two times. The rapidity of the movements, as will be explained, is not critical as the Doppler frequencies produced by the representative movements can be easily accommodated by the filters as 26 or 27.

The card holder may implement such movement by flicking the card with his wrist towards the door and two times away from the door. The actual movement may be implemented in an arc of a few inches or less.

As indicated, the movement of the card towards the door would cause an increase in the received frequency while the retraction of the card away from the door, will cause a decrease of the frequency.

The user is also instructed to implement the movements at least within a given period which may be anywhere from five to thirty seconds.

Now, let us assume that a user approaches the door 16 with a card 17 and is told that he has to move the card three times forward and two times back to gain access to the premises. The movement of the card is not critical as long as the card is moved forward rapidly and withdrawn slowly during the first sequence and is retracted rapidly and moved slowly during the second sequence. It is, of course, obvious that this control motion is also not absolutely necessary and a system can be implemented to detect any movement within a reasonable period associated with the above described sequences; namely, moving towards and away from the door.

Thus, the user approaches the door 16 and his movement would provide a Doppler frequency as he is near the door due to the reflection of the transmitted signal by his person or items on his person. However, this can be prevented, due to the fact that the transmitted energy is extremely small as the system depends upon a highly efficient reflector being moved within a radiation pattern; but to guard against the spurious Doppler frequency, a Doppler detector 30 is responsive to all Doppler frequency changes and activates the timing circuit 33. If the Doppler detector 30 were falsely triggered, the timing circuit 33 would prevent an opening of the door, as will be further explained.

The user takes the card 17 and rapidly moves it towards the door. This results in an output from the Doppler frequency filter 27, since the Doppler frequency is now high compared to the transmitted frequency. As indicated, he then withdraws it slower and hence, the first output from filter 27 is a pulse having a duration determined by the speed at which the particular user moved his card. This, of course, can be set within predetermined limits to accommodate anyone of a number of users. He then proceeds with the same movement two more times and therefore produces two more pulses via mixer 28 and filter 27.

The logic and counter circuit 31, as activated by the timing circuit 33, detects the three pulses and provides an indication signal to the combination control circuit 34 that three pulses are stored.

The comparator combination control circuit has stored therein a three in counter representing the positive storage mode. Upon receipt of the three signal, the logic and control counter 32 is activated by the comparator combination control. The user will now retract the card 17 rapidly two times from the door to provide a lower Doppler frequency, which results in two pulses from filter 26. These pulses are responded to by the logic and counter 32 and hence, a second output to the combination control is furnished indicating that the lock activator can be operated and the user gains access to the premises.

Upon closure of the door, the unit is reset by the timing circuit and ready for the next sequence of operation, as described above.

It is, of course, understood that a number of combinations can be implemented in such a system and that the movement of the card towards the door in a forward or reverse manner can be implemented in any one of a plurality of different sequences.

Essentially, the system operates to detect a predetermined pattern of motion indicative of a combination in a given time period.

THE TIMING CIRCUIT 33

As briefly indicated above, the timing circuit 33 is activated as soon as any Doppler frequency is detected via detector 30. As shown in the Figure, the detector 30 is operated by gate 41 as coupled to the inputs of both the high and low filters 26 and 27.

The gate 41 will transmit the output of either filter to detector 30. The detector activates the timing circuit 33. The timing circuit 33 may be a monostable multivibrator or any conventional and well known timing circuit; which for example, produces a predetermined duration pulse. The pulse may, for example, be ten seconds wide and serves to activate the logic and counter modules 31 and 32 for this period.

Hence, if the original Doppler frequency received by the detector 30 was not caused by a user having a card as 17, there will be no access to the counter circuits after the period.

In the above example, the combination given to the user was a three and a two, which meant that he was to move the card 17 three times towards the door rapidly and two times away from the door rapidly within a time of ten seconds. As indicated, the movement towards or away from the door is relatively rapid, as by a flicking of the card and so on. He may withdraw the card between forward movements reltively slow to assure that the Doppler frequencies he produces are substantial compared to those frequencies which he produces as a matter of course in withdrawing the card between the forward or reverse movements. These frequency differences are easily accommodated by the filters 26 and 27.

COMPARATOR COMBINATION CONTROL CIRCUIT 34

As indicated, this circuit stores a combination as in the above example of three, two, which is associated with the particular door and card 17. The comparator circuit may include a ROM or a binary counter as a storage means.

As indicated above and in the case of this combination, the comparator circuit when it receives a three from the counter 31, activates the counter 32. If in the above example, an additional digit were received by counter 31, counter 32 would be inactivated, counter 31 could not provide an output and the timing circuit 33 would time out; thus denying access to a user having a card as 17. In this manner, one could not anticipate the combination by attempting to flick or move a card in the vicinity of the door in a random manner.

It is also understood that although the above sequence as described has a forward and a reverse motion, they any combination could be implemented in exactly the same manner and as for example, four movements forward, two movements back and five movements forward and so on.

Since the differences between Doppler frequencies produced by motion are related to the velocity, a wide spread number of users who each move the card at a different rate, can be accommodated. This is done by accommodating the band pass of the filters 26 and 27. For example, typical Doppler frequencies occur from about 500Hz and higher. For slower motion, these frequencies are lower and hence, the filters as well as the receiver 24 can discriminate between these differences while permitting a wide range of higher frequencies to propogate therethrough.

For example, one user may move the card twice as fast as another. He may produce a Doppler frequency of 1,000 cycles, while the Doppler frequency of the slower user may be 500 cycles. These ranges can easily be accommodated by the filters and both would receive entry if the sequence of movements were in accordance with the combination.

In any event, it is simple for anyone to withdraw the card between movements slow enough so that the intervening frequencies are ignored.

Typical circuits for use in the comparator and timing circuit control are known in the art and the above described functions should enable one skilled to provide a plurality of circuits capable of performing each of the above described functions.

INTRUSION MODE

Normally, a door or an entrance is accessed during a given time period and in this case, the door 16 is accessed by the combination afforded by the reflecting card 17 and the above described circuitry. After hours, the door 16 is locked as is conventional. This is accomplished by the intrusion mode module 38.

Basically, the module 38 may be a switch or a bistable device. When operated in the intrusion mode, the module causes the lock actuate circuit 35 to prevent operation of the solenoid 36.

The intrusion circuit 38 further increases the power transmitted via transmitter 32 via the output control circuit 39. This output control circuit is a typical volume or gain control circuit and serves to raise the gain of the transmitting amplifier to a level determined by the size of the room or area to be monitored.

Shown coupled to the transmitter 22 and the receiver 24 are two antennas designated as 23A and 25A. These antennas may be the same antennas as 23 and 25, which during the instrusion mode are turned away from the door either automatically by operation of the intrusion mode circuit 38 or manually.

Hence, the transmitter 22 operating at a higher power level is directed to propogate its frequency about the area to be protected. If an intruder gains access to the room either through the door 16 or through a window and so on, he will impinge the transmitted beam and cause a Doppler shift to be received by the antenna 25. This shift is coupled to the receiver 24. In the intrusion mode one is only concerned with relative motion and hence, gate 41 is coupled to the output of filters 26 and 27 and will cause detector 30 to operate the alarm circuit 42.

As is noted, the alarm circuit is enabled during the intrusion mode thus allowing an audible or other alarm to occur for the detection of any Doppler shift during times when entry to the premises is not permitted.

While the gate 41 is shown coupled to the outputs of filters 26 and 27, it can also be applied to the output of the mixers 28 and 29 and the detector 30 may include its own filter.

It is also shown that the intrusion mode circuit is coupled to the filters 26 and 27. This is done so that the band pass of these filters may be made larger during the intrusion mode to enable the system to now detect relatively slow motion.

Of course, during the next business day, the system has to be returned to the first mode to allow entry. This is done by a supervisor, who may manually operate the intrusion circuit at the opening time.

If the system is used in conjunction with a security service, such as opening, even though an alarm might occur, would not be suspect.

In any event, the timing circuit 33 may include a 24 hour clock which would automatically place the system back in the door opening mode at opening and automatically place the system in the intrusion mode at closing. Such timers are well known and are presently used to control lights and so on on a 24 hour basis.

The system can of course, further include a supervisor's code which is known only to the person responsible for opening the establishment. This code, for example, may be different than the code required to gain entry to the premises. In such a system, the antennas 23 and 25 will be fixed as compared to antennas 23A and 25A. The Supervisor would then approach the door and move his card according to the Supervisor Code. These movements, since they occur outside the door, would be detected by an additional logic and counter with an additional comparator for storing the Supervisor code. Even though the alarm will be activated, the output of the Supervisor's comparator, as indicated by the dashed line from comparator 34 to the intrusion mode circuit 38, will place the intrusion mode circuit back into its first position. One can readily ascertain this operation from FIG. 2. When this occurs, the alarm will immediately go off and the Supervisor would then open the door by using the conventional code as indicated above the example, as a three and a two.

FIG. 3 shows a brief example of how the door entry mode could be automatically implemented by a Supervisor. As indicated above, the high and low Doppler filters as 26 and 27 operate during the intrusion mode. In an automatic system, all antennas as indicated above, would be included. The Supervisor would then access the door in the morning at opening and move his card, for example, twice forward and once away. This would cause two pulses to be applied to the Supervisor's logic counter 50 and one pulse to counter 51.

The Supervisor's comparator circuit stores the two and the one therein and provides an output when counters 50 and 51 indicate receipt of the two and the one. This output then automatically places the intrusion mode circuit 38 back into the lock activate mode.

Also shown coupled to the Supervisor comparator circuit is an input from the timing circuit 33. The timing circuit can continuously interrogate the comparator 33 during the intrusion mode to enable the same for a smaller interval than during the lock mode. Since the Supervisor knows this, he is instructed to move his card as 17 at a more rapid pace than necessary for example, than during the lock mode and to accomplish the Supervisor combination in a smaller interval of time.

The major advantages of such a system as described above is that one does not need keys or any locks on a door and the door is completely electronically opened. Furthermore, since the comparator circuit is electronic, it can store any one of a number of combinations which can be changed from day to day or as often as desired, without changing locks and keys and so on. The system thus, would have great utility in establishments such as hotels, motels and so on, as the combination can be changed as desired by merely changing the numbers stored in the comparator control circuit 34.

One can also use a card with a pattern of reflectors on the card. The reflectors would be strips of metal separated from each other by the plastic material. The user would sweep or move the card through the transmitted beam and hence, the received signal would contain a number of larger Doppler signals due to the reflecting material. In this manner, a single movement of the card would provide a signal permitting access to the enclosure. For example, a card may have on a surface, three metal strips of a highly reflective material. When the card is moved by a user in front of the transmitter, there will be three Doppler signals provided of high magnitude due to the reflecting material. The receiver circuitry would detect three large Doppler components and activate the bolt.

I claim:

1. A security system for permitting an authorized user to gain entry to a secured premises via a door which is locked by means of an electrically activated bolt, comprising:
   a. a Doppler transmitter for directing transmitted energy at a given frequency in the vicinity of said door,
   b. a Doppler receiving means responsive to a predetermined pattern of movements in the vicinity of said door to provide a series of output pulses according to said pattern,
   c. means for providing said predetermined pattern of movements in said vicinity of said door to therefore cause said receiving means to provide said output pulses, and
   d. means responsive to said pulses to verify that said pattern is authorized to activate said bolt to permit entry via the unlocking of said door.

2. The security system according to claim 1 wherein said means operative in said vicinity of said door includes:
   a relatively planar member having a reflecting surface and capable of reflecting said transmitted energy, said planar member adapted to be moved by a user to implement said predetermined pattern of movements in the vicinity of said door.

3. The security system according to claim 1 wherein said predetermined pattern of movements comprise a predetermined number of movements towards said door with a given rate of motion and a second predetermined number of movements away from said door.

4. The security system according to claim 1 wherein said receiving means is responsive to the change in said transmitted frequency as determined according to said movement.

5. The security system according to claim 4 wherein said change in frequency is positive with respect to said frequency as transmitted.

6. The security system according to claim 4 wherein said change in frequency is negative with respect to said frequency as transmitted.

7. The security system according to claim 1 wherein said means responsive to said pulses include storage means for storing therein a code manifesting said predetermined pattern of movements indicative of an authorized user.

8. The security system according to claim 1 further comprising:
   a. control means coupled to said receiving means and adapted to operate said receiving means in an intrusion mode to activate an alarm when a movement is detected by said receiver due to an unauthorized user present on said premises during said intrusion mode.

9. A security system operative as an intrusion detection system for a given area in a first mode and as an access system in a second mode to enable an authorized user to activate a lock associated with an entranceway securing said given area during said second mode, comprising:
   a. A Doppler transmitter system capable of directing a beam of energy at a given frequency in a first selected direction towards said entranceway and at a second selected direction about said given area,
   b. controllable Doppler receiving means controlled to operate during said second mode for responding to a predetermined pattern of movements about said entranceway to provide an output according to said pattern, and operative during said first mode to provide an output manifesting a movement within said area,
   c. means for providing said predetermined pattern about said entranceway during said second mode,
   d. means coupled to said receiving means and responsive to verify that said pattern is authorized during said second mode to activate said lock upon said verification, means responsive to said output manifesting a movement and operative during said first mode to provide an alarm for said movement within said area, and e. switching means associated with said receiving means and operative to place said receiving means in either of said first or second modes.

10. The system according to claim 9 wherein said transmitter operates at a higher power level during said first mode to provide more energy about said given area.

11. A security system operative as an intrusion detection system for a given area in a first mode and as an access system in a second mode to enable an authorized user to activate a lock associated with an entranceway securing said given area during said second mode, comprising:

a. a Doppler transmitter system capable of directing a beam of energy at a given frequency in a first selected direction about said given area and in a second selected direction towards said entranceway, b. a Doppler receiving system operative during said first mode to provide an output manifesting a movement within said given area, and operative during said second mode for responding to authorized movements about said entranceway to provide an output indicative of said movements about said entranceway, c. means coupled to said Doppler receiving means and operative in said first mode responsive to said output manifesting a movement within said area when said beam is selected in said first direction to provide an alarm for said movement within said given area, and operative during said second mode when said beam is directed at said entranceway responsive to said output in said second mode indicative of authorized movements to activate said lock and hence, enable access to said area via said entranceway.

* * * * *